US011027689B2

(12) United States Patent
Nagasawa

(10) Patent No.: US 11,027,689 B2
(45) Date of Patent: Jun. 8, 2021

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 131 days.

(21) Appl. No.: 15/891,706

(22) Filed: Feb. 8, 2018

(65) Prior Publication Data
US 2018/0281741 A1 Oct. 4, 2018

(30) Foreign Application Priority Data

Mar. 31, 2017 (JP) .............................. JP2017-070368

(51) Int. Cl.
B60R 21/2338 (2011.01)
B60R 21/207 (2006.01)
B60R 21/015 (2006.01)
B60R 21/231 (2011.01)
B60R 21/01 (2006.01)

(52) U.S. Cl.
CPC .... B60R 21/2338 (2013.01); B60R 21/01542 (2014.10); B60R 21/207 (2013.01); B60R 21/23138 (2013.01); *B60R 2021/01225* (2013.01); *B60R 2021/01231* (2013.01);
(Continued)

(58) Field of Classification Search
CPC ........ B60R 21/01542; B60R 21/01512; B60R 21/207; B60R 21/2338; B60R 21/23138; B60R 21/2334; B60R 2021/23382; B60R 2021/23384; B60R 2021/23146; B60R 2021/01225; B60R 2021/01238
See application file for complete search history.

(56) References Cited

U.S. PATENT DOCUMENTS 5,924,721 A 7/1999 Nakamura et al.
6,198,997 B1* 3/2001 Ishikawa ............. B60R 21/0132
180/282
(Continued)

FOREIGN PATENT DOCUMENTS

JP H09-272396 A 10/1997
JP H09-315262 A 12/1997
(Continued)

OTHER PUBLICATIONS

Office Action received in Japanese Patent Application No. 2017-070368 dated Oct. 30, 2018 (5 pages in Japanese with English translation).

*Primary Examiner* — Frank B Vanaman
(74) *Attorney, Agent, or Firm* — Smith, Gambrell & Russell, LLP

(57) ABSTRACT

An airbag device includes a movement obtaining unit, an airbag, and an airbag controller. The movement obtaining unit is configured to obtain a movement of an occupant in an automobile. The airbag is deployable with different thicknesses into a gap between the occupant and a side portion of the automobile. The airbag controller is configured to restrict the thickness of the airbag that deploys toward the gap so that the airbag is inserted into the gap, if the airbag controller determines that the gap is smaller than a predetermined value on the basis of the movement of the occupant obtained by the movement obtaining unit.

13 Claims, 6 Drawing Sheets

(52) U.S. Cl.
CPC ............... *B60R 2021/23146* (2013.01); *B60R 2021/23382* (2013.01)

(56) References Cited

U.S. PATENT DOCUMENTS

| | | | |
|---|---|---|---|
| 6,227,564 B1 | 5/2001 | Ikegami | |
| 6,308,983 B1* | 10/2001 | Sinnhuber | B60R 21/233 |
| | | | 280/735 |
| 6,918,459 B2 | 7/2005 | Breed | |
| 2001/0029416 A1* | 10/2001 | Breed | B60R 22/321 |
| | | | 701/45 |
| 2002/0113421 A1* | 8/2002 | Haeuslmeier | B60R 21/013 |
| | | | 280/741 |
| 2005/0127653 A1* | 6/2005 | Williams | B60R 21/233 |
| | | | 280/743.2 |
| 2008/0231026 A1 | 9/2008 | Naito et al. | |
| 2008/0238050 A1* | 10/2008 | Green | B60R 21/2338 |
| | | | 280/728.3 |
| 2015/0274116 A1* | 10/2015 | Jaradi | B60R 21/0136 |
| | | | 701/45 |
| 2017/0015266 A1* | 1/2017 | El-Jawahri | B60R 21/01512 |
| 2017/0334390 A1 | 11/2017 | Song et al. | |

FOREIGN PATENT DOCUMENTS

| | | |
|---|---|---|
| JP | H11-11253 A | 1/1999 |
| JP | 2000-16230 A | 1/2000 |
| JP | 2006-082664 A | 3/2006 |
| JP | 2008-230406 A | 10/2008 |
| JP | 2017-88007 A | 5/2017 |

* cited by examiner

AIRBAG DEVICE

CROSS-REFERENCE TO RELATED APPLICATIONS

The present application claims priority from Japanese Patent Application No. 2017-070368 filed on Mar. 31, 2017, the entire contents of which are hereby incorporated by reference.

BACKGROUND

1. Technical Field

The present invention relates to an airbag device, specifically, to an airbag device that deploys an airbag between a side portion of an automobile and an occupant.

2. Related Art

There is an airbag device that deploys an airbag between a side portion of an automobile and an occupant to protect the occupant from impact of a collision of the automobile. For example, a side airbag deployable toward the front of an automobile along a side portion of the automobile is disposed in a side portion of a seat. By deploying the side airbag, it is possible to receive an occupant shifted toward the side of the automobile due to a collision and to absorb impact of the collision.

However, such a side airbag deploys so as to project considerably toward the front from the seat of the automobile, and thus the deployment location of the side airbag may become displaced.

As a technology that suppresses a displacement in a deployment location of a side airbag, for example, Japanese Unexamined Patent Application Publication (JP-A) No. 2006-82664 proposes a side-airbag device that suitably controls the deployment-expansion location of a side airbag. The side-airbag device includes a main deployable portion that deploys around the side of the chest of an occupant and a sub deployable portion that deploys around the side of the head or the side of the waist of the occupant. The sub deployable portion has an inner surface on which a pocket having an opening is disposed. The opening faces a gas generating source disposed inside the main deployable portion. Thus, when the main deployable portion deploys, the pressure of a deployment gas is applied into the pocket and enables the side airbag to easily deploy toward the vehicle upper side or the vehicle lower side, that is, in a direction deeper into the pocket, thereby suppressing a displacement of the deployment location of the side airbag.

However, because the side-airbag device in JP-A No. 2006-82664 deploys the side airbag in the vehicle up-down direction in order to control the deployment location of the side airbag, the side-airbag device has a drawback in which deployment toward the front is delayed. Therefore, it may become impossible for the side airbag to deploy at a predetermined location by, for example, coming into contact, in process of the deployment, with an occupant shifted toward a side portion of an automobile due to a collision. In particular, in an autonomously operated automobile, an occupant is shifted toward a side portion of the automobile at a high velocity and thus may reach an airbag deployment path before an airbag reaches the path. As a result, it may become impossible to deploy the airbag between the occupant and the side portion of the automobile and to receive the occupant by the air bag.

SUMMARY OF THE INVENTION

To address such a drawback in the related art, it is desirable to provide an airbag device that ensures reception of an occupant by an airbag.

An aspect of the present invention provides an airbag device including a movement obtaining unit that is configured to obtain a movement of an occupant in an automobile; an airbag that is deployable with different thicknesses into a gap between the occupant and a side portion of the automobile; and an airbag controller that is configured to restrict a thickness of the airbag that deploys toward the gap so that the airbag is inserted into the gap, if the airbag controller determines that the gap is smaller than a predetermined value on the basis of the movement of the occupant obtained by the movement obtaining unit.

DETAILED DESCRIPTION

Examples of the present invention will be described below on the basis of the attached drawings.

FIRST EXAMPLE

Figure 1:
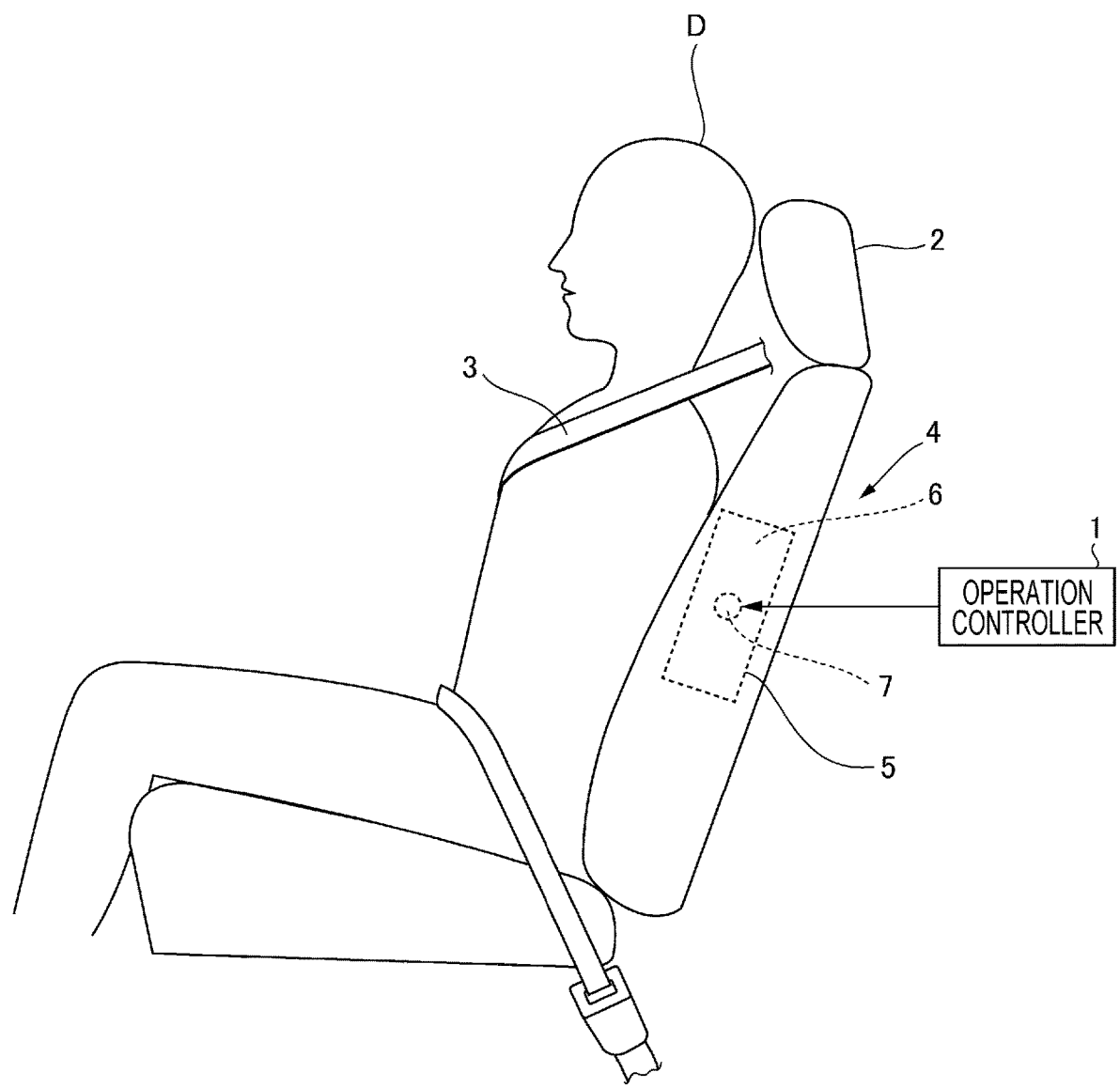
FIG. 1 illustrates the structure of an automobile that includes an airbag device according to a first example of the present invention.

FIG. 1 illustrates the structure of an automobile that includes an airbag device according to a first example of the present invention. The automobile is autonomously operable and includes an operation controller 1 that controls autonomous operation, a seat 2 disposed inside a passenger compartment, a seat belt 3 disposed at the seat 2, and an airbag device 4 coupled to the operation controller 1.

The operation controller 1 controls the autonomous operation of the automobile on the basis of pre-stored map data and a current position of the automobile. The operation controller 1 controls, for example, braking and steering of the automobile. The autonomous operation is not limited to operation that completely controls automobile operation. The autonomous operation includes an operation support system that supports an occupant D in a part of automobile operation.

The seat belt 3 is a three-point seat belt, which secures the shoulders and waist of the occupant D sitting in the seat 2.

The airbag device 4 includes a housing 5 disposed in a side portion of the seat 2, an airbag 6 stored in the housing 5, and an inflator 7 disposed in the housing 5.

The airbag 6 is a side airbag that is disposed in the seat 2 and deployable toward the vehicle front side along a side portion of the automobile. The airbag 6 is deployable with thicknesses different in the vehicle width direction, into a gap between the occupant D and the side portion of the automobile.

The inflator 7 is used to deploy the airbag 6.

Next, the structure of the airbag device 4 will be described in detail.

Figure 2:
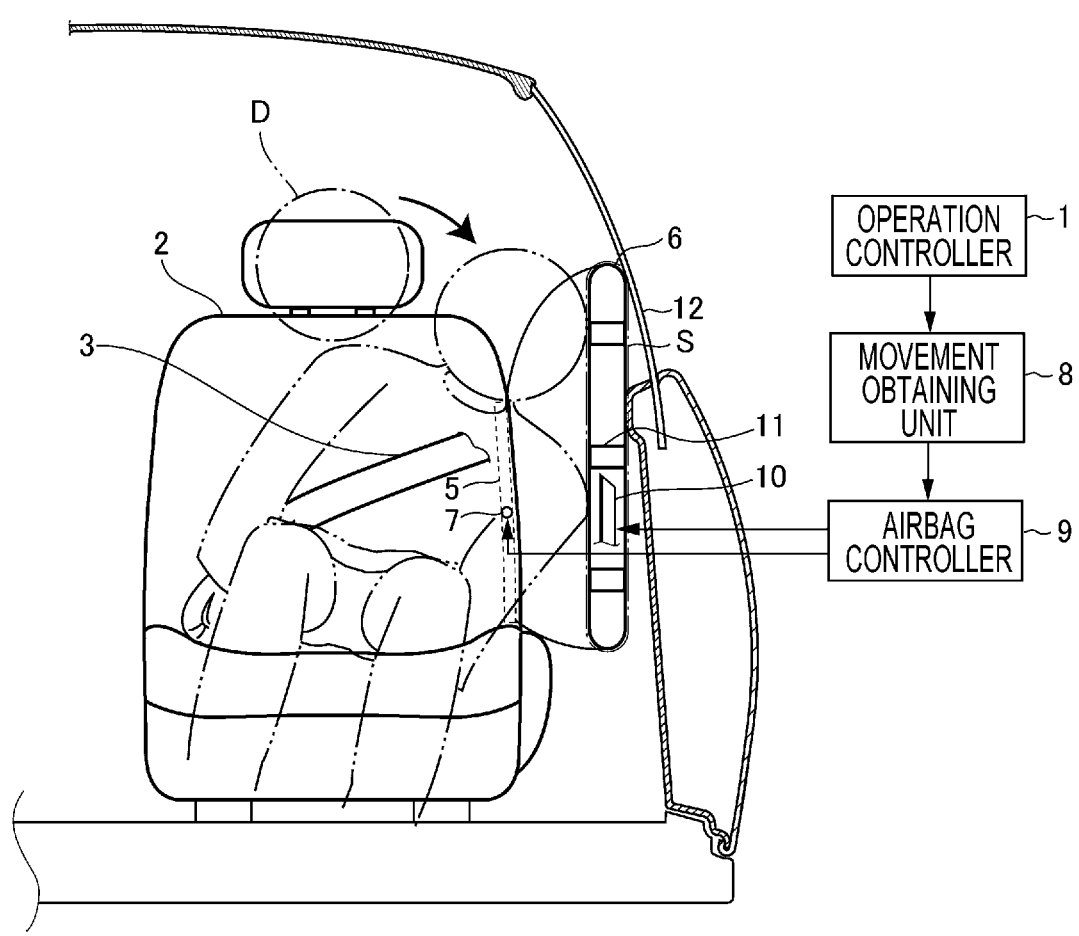
FIG. 2 illustrates the structure of the airbag device.

As illustrated in FIG. 2, the airbag device 4 includes a movement obtaining unit 8 coupled to the operation controller 1. An airbag controller 9 is coupled to the movement obtaining unit 8. The airbag controller 9 is coupled to each of the inflator 7 and a tether cutting member 10. The airbag 6 includes inner tethers 11 disposed therein.

Each inner tether 11 is disposed inside the airbag 6 so as to extend in the vehicle width direction of the automobile. One end of each inner tether 11 is secured to the airbag 6 on the side of a side portion 12 of the automobile and another end thereof is secured to the airbag 6 on the side of the seat 2. The thus secured inner tethers 11 restrict the deployment thickness of the airbag 6 in the vehicle width direction to deploy the airbag 6 with a thickness that is smaller by a predetermined degree.

The tether cutting member 10 is used to cut the inner tethers 11 to thereby cause the airbag 6 to deploy larger in the vehicle width direction, in other words, to thereby increase the thickness of the airbag 6.

The movement obtaining unit 8 obtains the movement of the occupant D. Specifically, the movement obtaining unit 8 obtains the movement of the automobile on the basis of control information of the operation controller 1 and calculates the movement of the occupant D on the basis of the obtained movement of the automobile.

Figure 3:
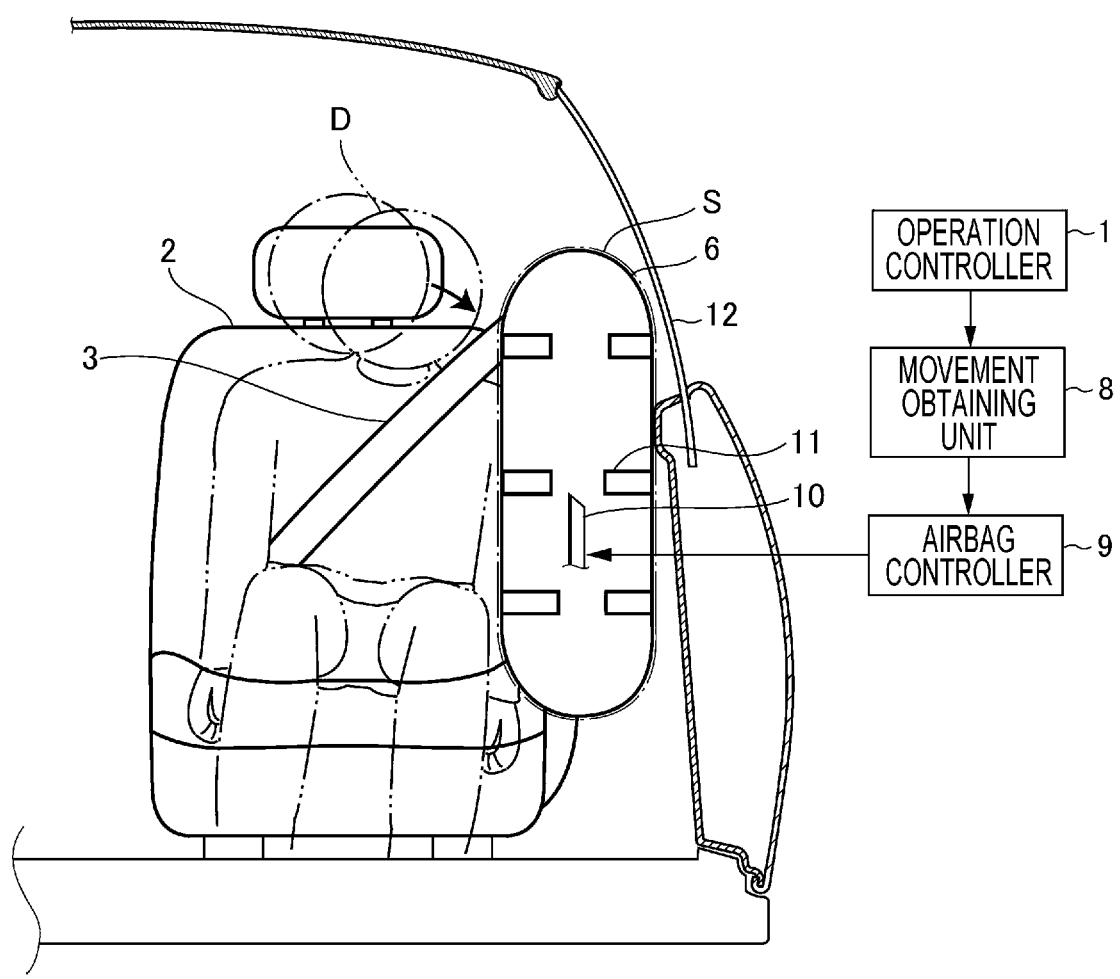
FIG. 3 illustrates a state in which restriction of the thickness of an airbag that deploys toward a gap is cancelled.

The airbag controller 9 calculates the gap S between the occupant D and the side portion 12 of the automobile on the basis of the movement (shift), which is obtained by the movement obtaining unit 8, of the occupant D toward the side portion 12. If the airbag controller 9 determines that the gap S is smaller than a predetermined value, the airbag controller 9 restricts the thickness in the vehicle width direction of the airbag 6 that deploys toward the gap S, so that the airbag 6 is inserted into the gap S. Specifically, the airbag controller 9 deploys the airbag 6 with one of different thicknesses by controlling the tether cutting member 10. If the airbag controller 9 determines that the gap S is smaller than the predetermined value, the airbag controller 9 deploys, without driving the tether cutting member 10, the airbag 6 with a thickness that is smaller by a predetermined degree. In contrast, as illustrated in FIG. 3, if the airbag controller 9 determines that the gap S calculated on the basis of the movement, which is obtained by the movement obtaining unit 8, of the occupant D toward the side portion 12 of the automobile is larger than or equal to the predetermined value, the airbag controller 9 cuts the inner tethers 11 by using the tether cutting member 10 to cancel restriction of the thickness of the airbag 6 that deploys toward the gap S and deploy the airbag 6 with a normal thickness.

Next, operation in the first example will be described.

First, as illustrated in FIG. 1, the automobile with the occupant D sitting in the seat 2 is autonomously operated by the operation controller 1. During autonomous operation, the operation controller 1 sequentially outputs a movement amount of the automobile, for example, a degree of steering of the automobile to the movement obtaining unit 8 of the airbag device 4. Upon receiving the degree of steering of the automobile from the operation controller 1, the movement obtaining unit 8 calculates the movement of the occupant D on the basis of the degree of steering. Preferably, the movement obtaining unit 8 obtains a degree of braking of the automobile, in addition to the degree of steering, from the operation controller 1. In this case, it is possible to calculate the movement of the occupant D with high accuracy.

If a collision of the automobile occurs, the impact of the collision is detected by a collision detector (not shown), and a signal of the collision is received by the airbag controller 9 (FIG. 2). Upon receiving the collision signal, the airbag controller 9 obtains the movement of the occupant D from the movement obtaining unit 8.

The airbag controller 9 then calculates the gap S between the occupant D and the side portion 12 on the basis of the velocity of the movement of the occupant D obtained from the movement obtaining unit 8. The movement of the occupant D is, for example, the movement of the occupant D toward the side portion 12 of the automobile. If the airbag controller 9 determines that the gap S is smaller than a predetermined value, the airbag controller 9 injects a deployment gas into the airbag 6 from the inflator 7, without driving the tether cutting member 10, to deploy the airbag 6 toward the front.

For example, upon receiving, from the movement obtaining unit 8, the movement of the occupant D in autonomous operation in which steering and braking are simultaneously performed, the airbag controller 9 determines that the gap S is small and deploys the airbag 6 without driving the tether cutting member 10.

Here, when the automobile is manually operated, it is difficult to perform braking and steering at maximum capacity of the automobile. However, when the automobile is autonomously operated by the operation controller 1, the braking and steering at the maximum capacity of the automobile are possible. Therefore, both the movement of the automobile and the acceleration of the occupant D are larger in autonomous operation compared with manual operation. As a result, the gap S may rapidly become smaller. In that case, if the thickness of the airbag 6 is not restricted and the airbag 6 is deployed with the normal thickness, the airbag 6 comes into contact with the occupant D and becomes impossible to deploy at a predetermined location. Moreover, if the occupant D is shifted so as to close the gap S before the deployment of the airbag 6, the airbag 6 becomes impossible to deploy between the occupant D and the side portion 12 of the automobile. As a result, the occupant D may not be received by the airbag.

Considering the above circumstance, the thickness in the vehicle width direction of the airbag 6 is restricted by the inner tethers 11, and the airbag 6 is deployed toward the front with a thickness that is smaller by the predetermined degree than in a case where the airbag 6 does not have the inner tethers 11. The length of each inner tether 11 is pre-adjusted so that the airbag 6 is inserted into the gap S, on the basis of a value of the gap S that is calculated based on that the movement of the occupant D is rapid. Thus, the airbag 6, whose thickness is restricted by the inner tethers 11, starts deployment toward the gap S with a thickness that enables insertion of the airbag 6 into the gap S.

As described above, if the gap S rapidly becomes smaller due to the rapid movement of the occupant D, the airbag 6 starts deployment with a thickness smaller than the gap S. Therefore, it is possible to insert the airbag 6 smoothly into the gap S while the airbag 6 deploys and to ensure the deployment of the airbag 6 between the occupant D and the side portion 12 of the automobile. Moreover, the deployment of the airbag 6 with the restricted thickness achieves an increase in deployment speed. The increase in the deployment speed enables the airbag 6 to receive, without fail, the occupant D that is shifted toward the side portion 12 of the automobile at a high velocity due to a collision.

When being deployed, the airbag 6 is restricted by a plurality of the inner tethers 11 so as to have a thickness that is substantially uniform overall. Therefore, partial contact of the airbag 6 with the occupant D is suppressed, which enables smooth insertion of the airbag 6 into the gap S.

Figure 4:
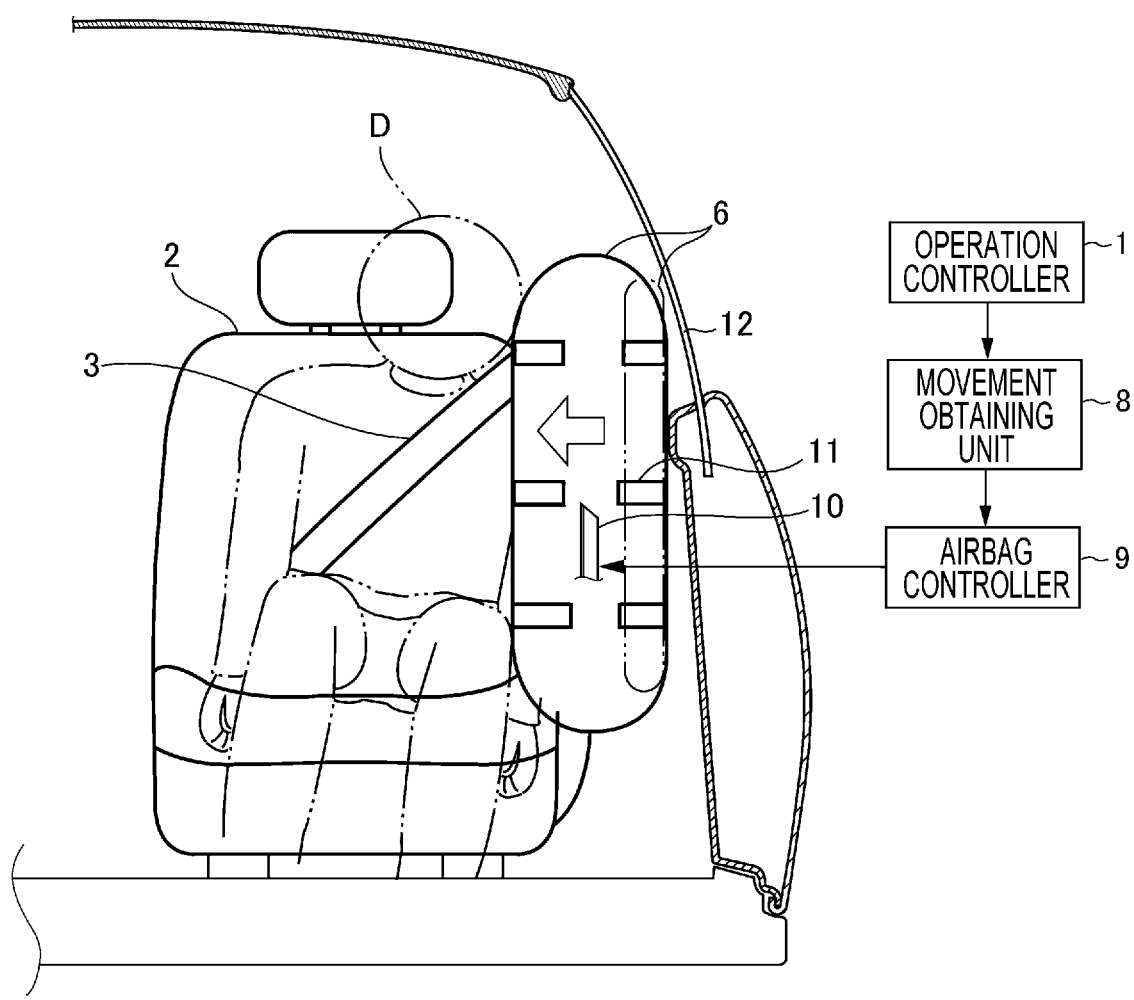
FIG. 4 illustrates a state in which the deployment thickness of the airbag is increased after the airbag has been inserted into the gap.

The airbag controller 9 preferably controls the thickness of the airbag 6 such that the thickness is increased after the airbag 6 has been inserted into the gap S, as illustrated in FIG. 4. Specifically, the airbag controller 9 drives the tether cutting member 10 to cut the inner tethers 11 while injecting the deployment gas from the inflator 7 into the airbag 6. As a result of the cutting of the inner tethers 11, restriction of the thickness of the airbag 6 is cancelled, which causes the airbag 6 to deploy such that the thickness thereof is increased with the injection of the deployment gas.

As described above, the airbag 6 is deployed such that the thickness is increased after the airbag 6 has been inserted into the gap S, which ensures reception of the occupant D and absorption of the collision impact on the occupant D.

If a collision of the automobile occurs, the airbag controller 9 receives, from the movement obtaining unit 8, the movement of the occupant D toward the side portion 12 of the automobile. As illustrated in FIG. 3, if the received movement of the occupant D is slow and thus the airbag controller 9 determines that the gap S is larger than or equal to the predetermined value, the airbag controller 9 drives the tether cutting member 10 to cut the inner tethers 11 and injects the deployment gas from the inflator 7 into the airbag 6 to deploy the airbag 6. The airbag 6, without thickness restriction by the inner tethers 11, starts deployment with a larger thickness. The thickness of the airbag 6 is pre-adjusted to ensure absorption of collision impact on the occupant D. Therefore, when the airbag 6 does not become into contact with the occupant D while deploying toward the gap S, the airbag 6 is deployed without thickness restriction to ensure absorption of the collision impact on the occupant D.

According to the first example, the airbag controller 9 restricts the thickness of the airbag 6 that deploys toward the gap S so that the airbag 6 is inserted into the gap S, if the airbag controller 9 determines that the gap S between the occupant D and the side portion 12 of the automobile is smaller than the predetermined value on the basis of the movement of the occupant D. Therefore, it is possible to ensure the reception of the occupant D by the airbag 6.

SECOND EXAMPLE

The movement obtaining unit 8 of the first example calculates the movement of the occupant D on the basis of the control information of the operation controller 1; however, the movement of the occupant D may be obtained by any other methods.

Figure 5:
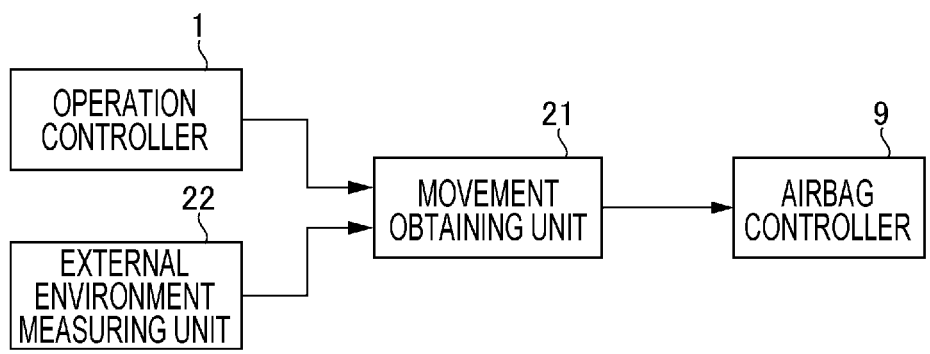
FIG. 5 is a block diagram indicating main parts of an airbag device according to a second example.

For example, a movement obtaining unit 21, as an alternative to the movement obtaining unit 8 of the first example, may be disposed, and an external environment measuring unit 22 may be additionally coupled to the movement obtaining unit 21, as illustrated in FIG. 5.

The external environment measuring unit 22 measures the external environment in which the automobile travels. The external environment measuring unit 22 may be, for example, a camera.

The movement obtaining unit 21 receives external environmental information measured by the external environment measuring unit 22. The movement obtaining unit 21 receives the control information from the operation controller 1, as is in the first example. The movement obtaining unit 21 estimates the movement of the occupant D on the basis of the external environmental information received from the external environment measuring unit 22 and the control information received from the operation controller 1.

For example, if the external environment measuring unit 22 detects an obstacle present in front of the automobile, the movement obtaining unit 21 determines whether the automobile will collide with the obstacle, on the basis of the control information of the operation controller 1. If it is determined that the automobile will collide with the obstacle, the movement obtaining unit 21 calculates an amount of collision impact to be applied to the automobile, on the basis of the external environmental information and the control information. The movement obtaining unit 8 then estimates the movement of the occupant D sitting in the seat 2 on the basis of the calculated amount of the impact to be applied to the automobile.

Then, the airbag controller 9 calculates the gap S on the basis of the movement of the occupant D estimated by the movement obtaining unit 21 and controls the thickness of the airbag 6 that deploys toward the gap S.

According to the second example, the thickness of the airbag 6 that deploys toward the gap S is controlled on the basis of the movement of the occupant D estimated by the movement obtaining unit 21. Thus, it is possible to deploy the airbag 6 at an early stage and to insert the airbag 6 into the gap S, which ensures reception of the occupant D by the airbag 6.

THIRD EXAMPLE

The movement obtaining unit of each of the first and second examples may obtain measurement information obtained by measuring the movement of the occupant D in the automobile.

Figure 6:
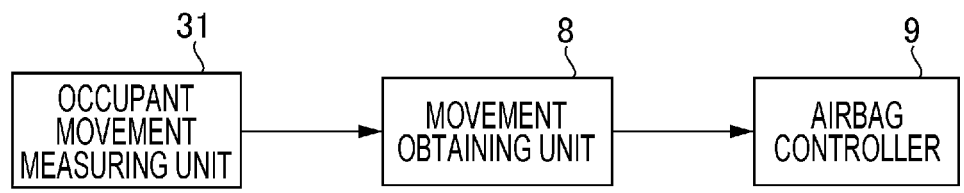
FIG. 6 is a block diagram indicating main parts of an airbag device according to a third example.

For example, an occupant movement measuring unit 31, as an alternative to the operation controller 1 of the first example, may be coupled to the movement obtaining unit 8, as illustrated in FIG. 6.

The occupant movement measuring unit 31 directly measures the movement of the occupant D in the automobile. The occupant movement measuring unit 31 may be, for example, a camera.

The movement obtaining unit 8 calculates the movement of the occupant D toward the side portion 12 of the automobile on the basis of the measurement information obtained by the occupant movement measuring unit 31.

The airbag controller 9 calculates the gap S on the basis of the movement of the occupant D calculated by the movement obtaining unit 8 and controls the thickness of the airbag 6 that deploys toward the gap S.

According to the third example, it is possible for the movement obtaining unit 8 to calculate the movement of the occupant D toward the side portion 12 with high accuracy because the occupant movement measuring unit 31 directly measures the movement of the occupant D. Therefore, the deployment thickness of the airbag 6 can be appropriately controlled.

In each of the aforementioned first to third examples, the airbag 6 is deployable with two different thicknesses. However, the number of the different thicknesses is not limited to two provided that the airbag 6 is deployable with different thicknesses. For example, the airbag controller 9 may perform stepwise control such that the airbag 6 has one of different thicknesses according to the movement of the occupant D. In other words, the airbag controller 9 sets a plurality of values in a stepwise manner in accordance with the velocity of the movement of the occupant D and deploys the airbag 6 with a thickness in accordance with the set value. Therefore, it is possible to deploy the airbag 6 with a maximal size and to receive the occupant D more safely.

In each of the aforementioned first to third examples, the airbag 6 is restricted by the plurality of inner tethers 11, immediately after starting deployment to be inserted into the gap S, so as to have a thickness that is substantially even overall; however, thickness restriction is not limited thereto provided that the thickness is restricted such that the airbag 6 is inserted into the gap S.

For example, the airbag 6 may be restricted to have a smaller thickness at a portion close to a leading end portion that is at the foremost position when the airbag 6 is deployed. Therefore, it is possible to insert the airbag 6 into the gap S even when the gap S is small and to ensure reception of the occupant D by the airbag 6 with higher certainty.

In each of the aforementioned first to third examples, the thickness of the airbag 6 is restricted by the inner tethers 11; however, thickness restriction is not limited to restriction by the inner tethers 11 provided that the thickness of the airbag 6 is restricted such that the airbag 6 is inserted into the gap S.

Figure 7:
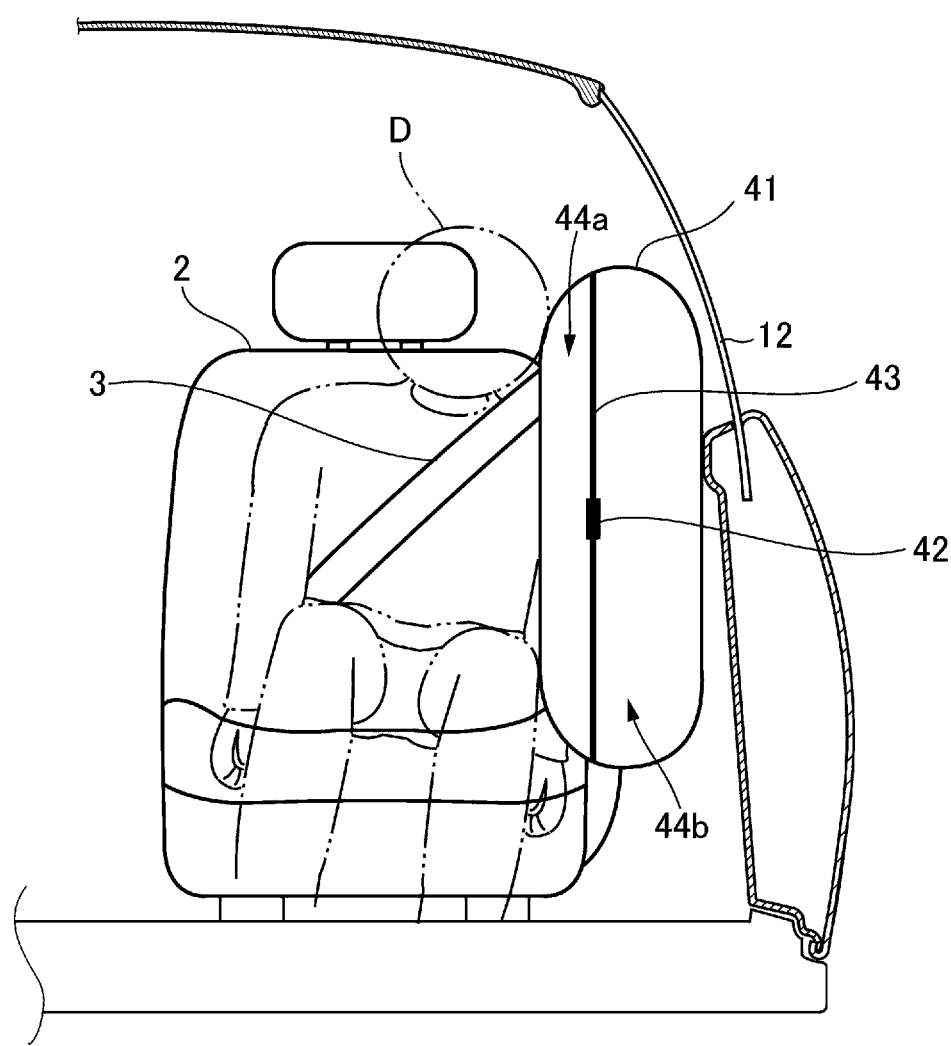
FIG. 7 illustrates main parts of an airbag device according to a modification of the first to third examples.

For example, an airbag 41 may be disposed as an alternative to the airbag 6 of the first example, and a pressure valve 42 may be disposed as an alternative to the inner tethers 11 of the first example, as illustrated in FIG. 7.

The airbag 41 is divided by a divider 43 in the vehicle width direction into two deployment chambers 44a and 44b.

The pressure valve 42 is disposed in the divider 43. When the deployment gas is injected from the inflator 7 into the deployment chamber 44a of the airbag 41 at a pressure higher than or equal to a predetermined pressure, the deployment gas flows into the deployment chamber 44b.

Therefore, it is possible to deploy the airbag 41 with one of different thicknesses, by controlling the pressure of the deployment gas to be injected into the airbag 41 from the inflator 7.

In each of the aforementioned first to third examples, the tether cutting member 10 mechanically cuts the inner tethers 11; however, the tether cutting member 10 is not limited thereto.

For example, the cutting member 10 may be a fragile portion that is included in each inner tether 11 and can be cut by being subjected to a predetermined pressure. The fragile portions enable the airbag controller 9 to cut the inner tether 11 at the fragile portions by controlling the pressure inside the airbag 6 to thereby vary the deployment size of the airbag 6.

In each of the aforementioned first to third examples, the airbag 6 is a side airbag that is disposed in the seat 2 and deployable toward the front along the side portion 12 of the automobile. However, the airbag 6 is not limited thereto provided that the airbag 6 is deployable with different thicknesses, into the gap S between the occupant D and the side portion 12 of the automobile.

For example, the airbag 6 may be a curtain airbag that is disposed so as to extend in a front-rear direction of the automobile along an upper edge portion of the side portion 12 of the automobile and that is deployable toward the lower side of the automobile along the side portion 12.

In each of the aforementioned first to third examples, the airbag device 4 is disposed in an autonomously operated automobile but may be disposed in a manually operated automobile. However, in a manually operated automobile, the movement of the occupant D tends to change less excessively than in an autonomously operated automobile. Thus, the airbag device 4 is preferably disposed in an autonomously operated automobile.

The invention claimed is:

1. An airbag device comprising:
    a movement obtaining unit that is configured to gauge movement of a sitting occupant in an automobile;
    an airbag that is deployable with different thicknesses into a gap between the occupant and a side portion of the automobile; and
    an airbag controller that, after a collision detection is received by the airbag controller, is configured to restrict a thickness of the airbag that deploys toward the gap so that the airbag is inserted into the gap, if the airbag controller determines that the gap is smaller than a predetermined value on a basis of a determination by the movement obtaining unit, which determination by the movement obtaining unit is received by the airbag controller after the collision detection is received by the airbag controller, and wherein the movement obtaining unit is configured to obtain a degree of steering of the automobile and calculate movement of the occupant based at least in part on the degree of steering.

2. The airbag device according to claim 1, wherein the airbag controller is configured to control the thickness of the airbag so that the thickness is increased after the airbag has been inserted into the gap.

3. The airbag device according to claim 2, wherein the airbag controller is configured to cancel restriction of the thickness of the airbag that deploys toward the gap, if the airbag controller determines that the gap is larger than or equal to the predetermined value on the basis of the determination by the movement obtaining unit.

4. The airbag device according to claim 2, further comprising:
    an external environment measuring unit that is configured to measure an external environment in which the automobile travels,
    wherein the movement obtaining unit is configured to estimate the movement of the occupant on the basis of the external environment measured by the external environment measuring unit.

5. The airbag device according to claim 2, further comprising: a tether that is configured to restrict a deployment thickness of the airbag; and a tether cutting member that is configured to cut the tether,
    wherein the airbag controller is configured to control the tether cutting member to deploy the airbag with the different thicknesses.

6. The airbag device according to claim 1, wherein the airbag controller is configured to cancel restriction of the thickness of the airbag that deploys toward the gap, if the airbag controller determines that the gap is larger than or equal to the predetermined value on the basis of the determination by the movement obtaining unit.

7. The airbag device according to claim 6, further comprising:
    an external environment measuring unit that is configured to measure an external environment in which the automobile travels,
    wherein the movement obtaining unit is configured to estimate the movement of the occupant on the basis of the external environment measured by the external environment measuring unit.

8. The airbag device according to claim 6, further comprising: a tether that is configured to restrict a deployment thickness of the airbag; and a tether cutting member that is configured to cut the tether,
wherein the airbag controller is configured to control the tether cutting member to deploy the airbag with the different thicknesses.

9. The airbag device according to claim 1, further comprising:

an operation controller that is configured to control autonomous operation of the automobile,
wherein the movement obtaining unit is configured to obtain the degree of steering on the basis of control information of the operation controller.

10. The airbag device according to claim 1, further comprising:

a tether that is configured to restrict a deployment thickness of the airbag; and a tether cutting member that is configured to cut the tether,
wherein the airbag controller is configured to control the tether cutting member to deploy the airbag with the different thicknesses.

11. The airbag device according to claim 1, wherein the movement obtaining unit is configured to gauge lateral movement of the occupant in the automobile.

12. An airbag device comprising:

a movement obtaining unit that is configured to gauge movement of an occupant in an automobile;

an airbag that is deployable with different thicknesses into a gap between the occupant and a side portion of the automobile;

an airbag controller that, after a collision detection is received by the airbag controller, is configured to restrict a thickness of the airbag that deploys toward the gap so that the airbag is inserted into the gap; if the airbag controller determines that the gap is smaller than a predetermined value on a basis of a determination by the movement obtaining unit; and an external environment measuring unit that is configured to measure an external environment in which the automobile travels, wherein the movement obtaining unit is configured to estimate the movement of the occupant on the basis of the external environment measured by the external environment measuring unit.

13. The airbag device according to claim 12, wherein the external environment measuring unit includes a camera configured to detect an obstacle in a path of the automobile, and the movement obtaining unit is configured to receive distance measurement information sourced from the camera, which is used by the movement obtaining unit in determining an anticipated level of automobile impact contact with the obstacle, which in turn is used by the movement obtaining unit to gauge lateral movement of the occupant.

* * * * *